US006092795A

United States Patent [19]
McGuire

[11] Patent Number: 6,092,795
[45] Date of Patent: Jul. 25, 2000

[54] FLUID AND ELASTOMER DAMPER

[75] Inventor: Dennis P. McGuire, Erie, Pa.

[73] Assignee: Lord Corporation, Cary, N.C.

[21] Appl. No.: 08/905,185

[22] Filed: Aug. 4, 1997

[51] Int. Cl.[7] .................................................. F16F 9/10
[52] U.S. Cl. ...................... 267/140.11; 267/219; 267/35; 267/141.2; 267/140.13; 188/322.21
[58] Field of Search .................... 267/140.11, 140.15, 267/136, 219, 220, 35, 141.2, 64.28, 152, 153, 64.15, 294, 293, 292; 180/300, 312, 902; 188/322.21, 378–380, 298, 269; 248/562, 636, 638; 244/54; 416/140

[56] References Cited

U.S. PATENT DOCUMENTS

| | | | |
|---|---|---|---|
| 2,421,585 | 6/1947 | Thiry | 248/358 |
| 3,403,899 | 10/1968 | Plume . | |
| 4,236,607 | 12/1980 | Halwes et al. | 188/1 B |
| 4,566,677 | 1/1986 | Le Pierres | 267/140.1 |
| 4,588,174 | 5/1986 | Konishi | 267/140.12 |
| 4,811,919 | 3/1989 | Jones | 244/54 |
| 4,817,925 | 4/1989 | Sprang et al. | 267/140.13 |
| 5,004,215 | 4/1991 | Aubry et al. | 267/140.1 |
| 5,127,607 | 7/1992 | McGuire | 244/54 |
| 5,178,241 | 1/1993 | Aubry | 188/317 |
| 5,197,692 | 3/1993 | Jones et al. | 244/54 |
| 5,251,883 | 10/1993 | Simon et al. | 267/136 |
| 5,316,442 | 5/1994 | Mouille | 416/134 A |
| 5,374,039 | 12/1994 | Schmidt et al. | 267/140.13 |
| 5,413,320 | 5/1995 | Herbst | 267/140.13 |
| 5,501,434 | 3/1996 | McGuire | 267/140.11 |
| 5,540,549 | 7/1996 | McGuire | 416/140 |
| 5,762,295 | 6/1998 | McGuire et al. | 244/54 |
| 5,816,372 | 10/1998 | Carlson et al. . | |

FOREIGN PATENT DOCUMENTS

| | | |
|---|---|---|
| 2 677 723-A1 | 12/1992 | France . |
| 2 259 747 | 3/1993 | United Kingdom . |
| WO 95/02131 | 1/1995 | WIPO . |

OTHER PUBLICATIONS

"Understanding Hydraulic Mounts for Improved Vehicle Noise, Vibration and Ride Qualities," Flower, Lord Corporation, LL–2166, 1985.
Fluidlastic® Technology, Lord Aerospace, PB–6310, Apr. 1991.
Fluidlastic® Dampers and Isolators for Vibration Control Helicopters, McGuire, Lord Corporation, 1LL–6502, 1994.

*Primary Examiner*—Douglas C. Butler
*Attorney, Agent, or Firm*—Randall S. Wayland; James W. Wright; Wayne W. Rupert

[57] ABSTRACT

A fluid damper to damp unwanted vibration between a first member (21) and a second member (23, 23'), such as between a rotor blade and hub within a helicopter rotor system. According to a first aspect, the fluid damper (20) includes an outer member (22), first and second inner members (24, 24'), first and second elastomeric elements (26, 26'), a hollow (28), a divider (30) subdividing hollow (28) into first (32) and second (32') operating chambers, a connector (34) interconnecting first (24) and second (24') inner members, a fluid passageway (36) interconnecting operating chambers (32, 32'), a fluid (38) contained within said passageway (36) and operating chambers (32, 32'), and a volume compensator (40) including a compensator chamber (42) housed within one of first (24) and second (24') inner members. In another aspect, an annular bubble trap (58) is formed in a wall portion (62) of the operating chamber (32) to focus any air bubbles into a fill port (54) during fill. In another aspect, a first chamber fill port (54) and a second chamber fill port (54') each interconnect with the annular bubble trap (58) to aid in filling the chamber (32') and removing air bubbles therefrom. In yet another aspect, a first fill port (54) interconnects to the operating chambers (32, 32') and a second fill port (56) interconnects to the compensator chamber (42) for allowing separate fill of the compensator (42) and operating chambers (32, 32').

16 Claims, 3 Drawing Sheets

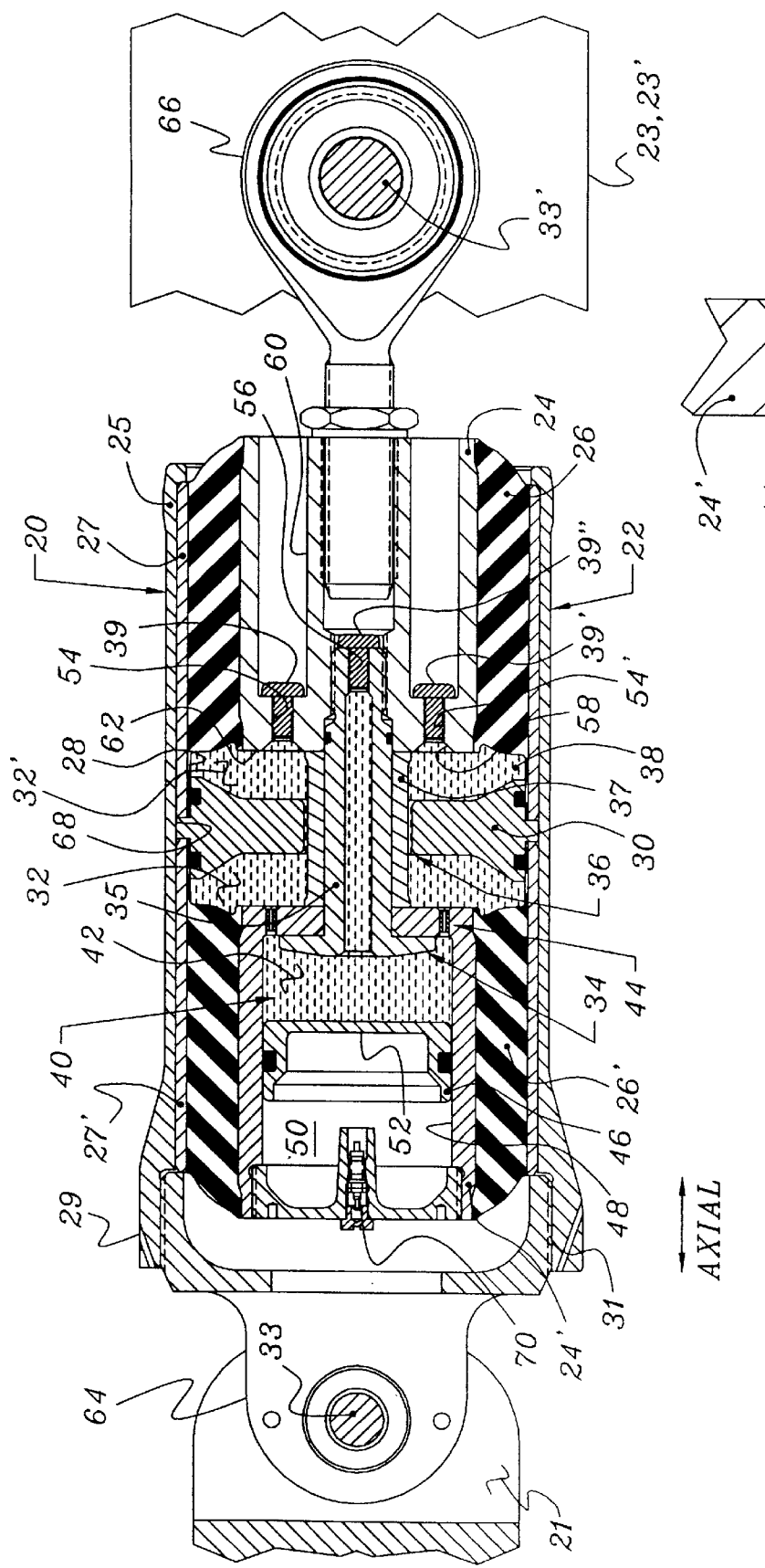
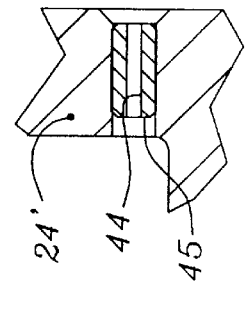
Fig. 1a
Fig. 1b

FLUID AND ELASTOMER DAMPER

FIELD OF THE INVENTION

This invention relates to devices for controlling dynamic vibration. Specifically, it relates to fluid dampers for control of vibration between first and second members.

BACKGROUND OF THE INVENTION

Fluid or hydraulic mountings include a fluid to augment isolation and/or damping characteristics achievable within elastomer mountings alone. This augmentation may take the form of additional parasitic damping or added inertial forces. Fluid mountings are generally described in LORD® Technical Article LL-2166 entitled "Understanding Hydraulic Mounts for Improved Vehicle Noise, Vibration and Ride Qualities" by W. C. Flower. Commonly assigned U.S. Pat. No. 4,811,919 to Jones describes a double-acting fluid mounting which incorporates a volume compensator. Other examples of fluid devices may be found in commonly assigned U.S. Pat. Nos. 5,540,549 to McGuire, 5,501,434 to McGuire, 5,413,320 to Herbst, 5,374,039 to Schmidt et al., 5,197,692 to Jones et al., and 5,127,607 to McGuire. Fluid mountings and dampers are, in essence, tunable passive devices which use a fluid to add additional tuned "damping" or tuned-fluid "inertia" effects.

Relating to fluid and elastomer dampers, such as those used to dissipate large amounts of energy and to control motions, such as the lead-lag motions of helicopter rotor blades, high damping forces are desired. Further, because the lead-lag damper is exposed to the wind stream caused by rotation of the rotor system, the damper must exhibit a small profile, such that aerodynamic drag is minimized. In particular, a concomitant result of dissipating such large amounts of energy is heat buildup within the damper, which may prematurely degrade the damper's performance. Therefore, designs which are thermodynamically efficient are desired. In addition, compensation of fluid thermal expansion and contraction, pressurization, and fill to remove air bubbles are all problems.

Therefore, there is a recognized need for more, smaller, thermodynamically efficient dampers as well as for dampers which include efficient expansion, pressurization, and fill characteristics.

SUMMARY OF THE INVENTION

Therefore, in light of the advantages and drawbacks of the prior art, the present invention is a fluid and elastomer damper for attaching between first and second members. The fluid and elastomer damper controls vibration between a first member (21) and a second member, such as between a rotor blade and hub within a helicopter. According to a first novel aspect of the invention, the fluid damper (20) includes an outer member (22), first and second inner members (24, 24'), first and second elastomeric elements (26, 26') interconnected between the first inner member (24) and outer member (22) and also between the second inner member (26') and the outer member (22), respectively. The inner members (24, 24'), outer member (22), and elastomer members (26, 26') cooperating to defining a hollow (28). A divider (30) is positioned to subdivide the hollow (28) into first (32) and second (32') operating chambers. A connector (34) rigidly interconnects the first (24) and second (24') inner members while a fluid passageway (36) interconnects the operating chambers (32, 32'). A viscous fluid (38) is contained within said passageway (36) and operating chambers (32, 32'). A volume compensator (40) including a compensator chamber (42) is housed within one of the first and second (24, 24') inner members.

According to another aspect, an annular bubble trap (58) is formed on a wall portion (62) of the operating chamber (32) to focus any air bubbles into a fill port upon filling the chamber (32') with fluid (38). Preferably, a first and second chamber fill ports (54, 54') each interconnect with the annular bubble trap (58) to aid in filling the chamber (32') and removing any air bubbles therefrom.

In yet another novel aspect, a first fill port (54) interconnects to one of the operating chambers (32, 32') and a second fill port (56) interconnects to the compensator chamber (42) thereby allowing separate fill of the compensator (42) and operating chambers (32, 32').

It is an advantage in one aspect of the present invention that the divider which, in part, preferably forms an annular passageway has a direct thermodynamic heat transfer path to the outer member, thus minimizing heat buildup within the damper.

It is an advantage in another aspect that the volume compensator is located within the inner member, thus contributing to a shorter length of the damper which reduces aerodynamic drag.

It is an advantage in yet another aspect that fluid fill of the damper is simplified by having separate fill ports for the compensator chamber and operating chambers.

It is an advantage in another aspect that removal of bubbles during the fill operation is improved by including a bubble trap which focuses the air bubbles into one or more fill ports.

The above-mentioned and further features, advantages, and characteristics of the present invention will become apparent from the accompanying descriptions of the preferred embodiments and attached drawings.

BRIEF DESCRIPTION OF THE DRAWINGS

The accompanying drawings which form a part of the specification, illustrate a key embodiment of the present invention. The drawings and description together, serve to fully explain the invention. In the drawings, FIG. 1a is a partial cross-sectioned side view of the present invention fluid and elastomer damper, FIG. 1b is a partial cross-sectioned side view of the lock passage between the compensator and an operating chamber.

DETAILED DESCRIPTION OF THE INVENTION

Figure 1C:
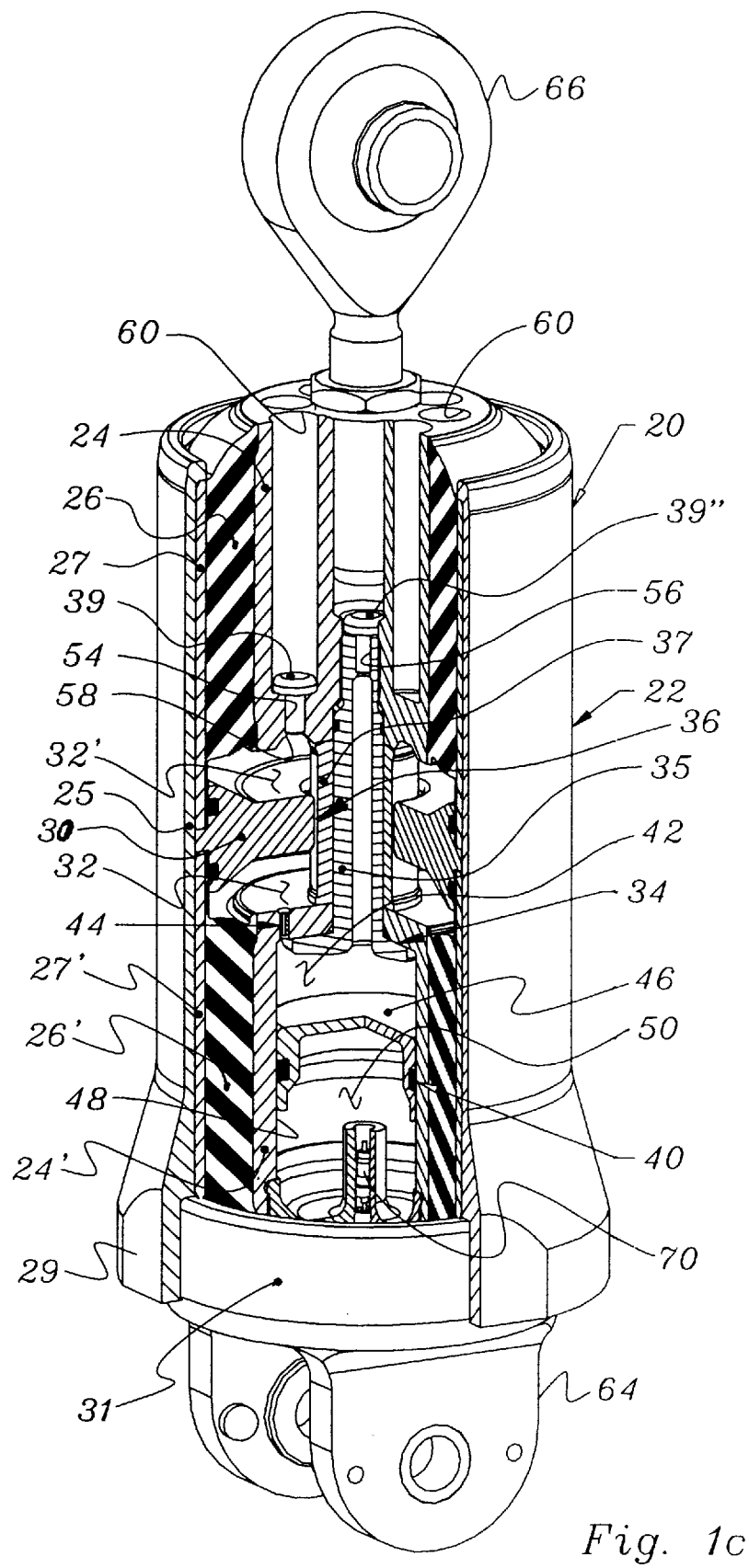
FIG. 1c is a cutout isometric view of the fluid and elastomer damper.

Referring now to the Drawings where like numerals denote like elements, in FIGS. 1a–1c, shown generally at 20, is a preferred embodiment of the fluid damper. Although described with reference to a damper, it should be understood that some aspects of the invention have broader applicability, thus they apply equally well to fluid mounts and isolators. The fluid damper 20 is useful for damping, and preferably minimizing, dynamic vibration transmitted between a first member 21, such as first portion of a rotor system (ex. rotor hub, or the like), and a second member 23, 23', such as a second portion of a helicopter (ex. rotor blade, rotor cuff, or the like). Likewise, the damper 20 could be interconnect in blade-to-blade orientation to damp lead lag motions therebetween. In helicopter applications, the outer member 22 of damper 20 interconnects to a rotor hub 21 by a clevis 64 (half shown) and fastener 33 (shown sectioned). The clevis 64 is secured to an end 29 of said outer member 22. Clevis 64 preferably includes a threaded cylindrical portion 31 which interconnects to like threaded portion on outer member 22. Similarly, inner members 24, 24', interconnect to a rotor cuff 23 or rotor blade 23' by a rod end 66 threadedly affixed to an end of inner member 24 and fastener 33'. The threaded rod ends 66 provide length adjustment for tracking of the rotor blades.

The damper 20 comprises a preferably cylindrical outer member 22 preferably manufactured from aluminum, or other lightweight, highly thermally conductive material. The outer member 22 described herein preferably collectively includes housing 25 and sleeves 27, 27', where sleeves 27,27' are received within housing and secured in place by cylindrical portion 31. Damper 20 further includes first and second preferably cylindrical inner members 24, 24', and first and second annular elastomeric elements 26, 26' flexibly interconnected, preferably by bonding, between the first inner member 24 and the sleeve 27 and between said second inner member 24' and said outer member 27', respectively.

The inner members 24, 24', outer member 22, and elastomer members preferably cooperate spatially to defining a hollow portion 28 centrally located within damper 20. A divider 30, preferably manufactured from a highly thermally conductive material, such as aluminum, is positioned to subdivide the hollow 28 into first 32 and second 32' operating chambers. The divider 30 is disc-shaped and mounted to an inner surface 68 of said outer member 22, such that there is an unimpeded direct radial thermal path to the outer member 22 for improved thermal conduction. Preferably, the divider 30 is portioned axially between ends of sleeves 27, 27'. The divider 30 as illustrated in FIG. 1a includes a pair of radial seals 100. The radial seals 100 engage elastomer skin portions 110 of the elastomeric elements 26, 26' which extend along an inner surface of the sleeves 27, 27'.

A connector 34 interconnects the first 24 and second 24' inner members. The connector 34 is preferably comprised of a hollow bolt 35 and an annular spacer 37. Bolt 35 when threaded into inner member 24 causes both inner members 24, 24' to contact the respective ends of spacer 37, thus forming in integral rigid unit. A fluid carrying passageway 36 interconnects between said operating chambers 32, 32'. Preferably, the passageway 36 is annular-shaped and is formed by the cooperation of the inner radial peripheral surfaces of the divider 30 and the outer radial peripheral surfaces of the spacer 37. Preferably, the exits and ensds are contoured to optimize fluid flow. Generally, the divider 30 surrounds the connector 34 to form the passageway 36.

A fluid 38 is contained within the passageway 36 and the operating chambers 32, 32' and also within the compensator chamber 42 which will be described later. The fluid 38 is preferably a high viscosity silicone fluid. It exhibits a preferable viscosity in the range of between about 1,000–10,000 centistokes, and more preferably between about 2,500–7,500 centistokes, and most preferably about 5,000 centistokes.

A volume compensator assembly 40 compensates for expansion of the fluid 38 due to heating and also pressurizes the fluid 38 within the damper 20 to minimize fluid cavitation. The compensator assembly 40 includes a compensator chamber 42 housed within the confines of the second inner member 24'. Alternatively, the compensator 40 could also be housed within the first inner member 24. The volume compensator 40 preferably includes a plurality of lock passages 44 (better seen in FIG. 1b) interconnecting the compensator chamber 42 to one of the operating chambers 32, 32'.

The lock passage 44 shown in FIG. 1b is formed in a tube 45 which is pressed into the axial end of inner member 24'. The dimensions (length and diameter) of the lock passage 44 are selected such that the passage is dynamically locked up (no flow therethrough) at the predominant operating frequency of the damper 20, which for the damper 20 shown herein is in the range of about 4 to 6.5 Hz. A sealed partition 46 is axially slideable along an inner peripheral surface 48 of one of the inner members 32, 32' and divides the charge chamber 50 from the compensator chamber 42. Charging the charge chamber 50 with about 100–200 psi of nitrogen gas through gas fill valve 70 exerts pressure against an axial surface 52 on the partition 46, thereby internally pressurizing the fluid 38 contained within the operating chambers 32, 32'.

In a novel aspect of the damper 20 which has applicability to fluid mounts, dampers, and isolators alike (hereinafter referred to as fluid devices), separate fill ports 54, 56 are utilized for filling the operating chambers 32, 32' and the compensator chamber 42. This solves the problem of removing air bubbles from the compensator chamber 40. Generally, air bubbles are difficult to remove from the compensator chamber 42 during fill operations because the diameters of lock passageways 44 tend to be very small. According to this novel aspect, the first fill port 54 which is used to fill the operating chambers 32, 32' passes through one of the inner members 24, 24' (ex. through the axial end of inner member 24). A second fill port 56 is used to fill the compensator chamber 42 and passes through the connector 34, and more specifically, through the hollow bolt 35. After fill, the egress of fluid is sealed via sealed screws 39, 39".

In another novel aspect with applicability beyond dampers, one of said operating chambers 32, 32' includes a bubble trap 58 to focus any air bubbles into at least one fill port (ex. first chamber fill port 54) during the fill operation. Preferably, the bubble trap 58 includes an annular depression formed into a wall portion 62 of one of said chambers 32, 32' into which said at least one fill port intersects. Preferably, the annular depression is formed in an axial face of one of said inner members 24, 24'.

It is preferable, that the at least one fill port be comprised of a first chamber fill port 54 and a second chamber fill port 54' to aid in filling said chambers 32, 32' by even more readily allowing any air bubbles to escape. Notably, when filling dampers and the like using a fluid 38 which exhibits a viscosity on the order of about 5,000 centistokes, the fill operation may take several hours. Therefore, it is imperative to aid in bubble removal. Preferably, the at least one fill port interconnects between one of said chambers 32, 32' and an enlarged recess 60 formed in an axial end of one of said inner members 24, 24'. The enlarged recess 60 allows overfill with fluid 38 such that when sealed screws 39, 39' are inserted, no air is trapped within the chamber 32'. Other like recesses remove unwanted weight.

Figure 2:
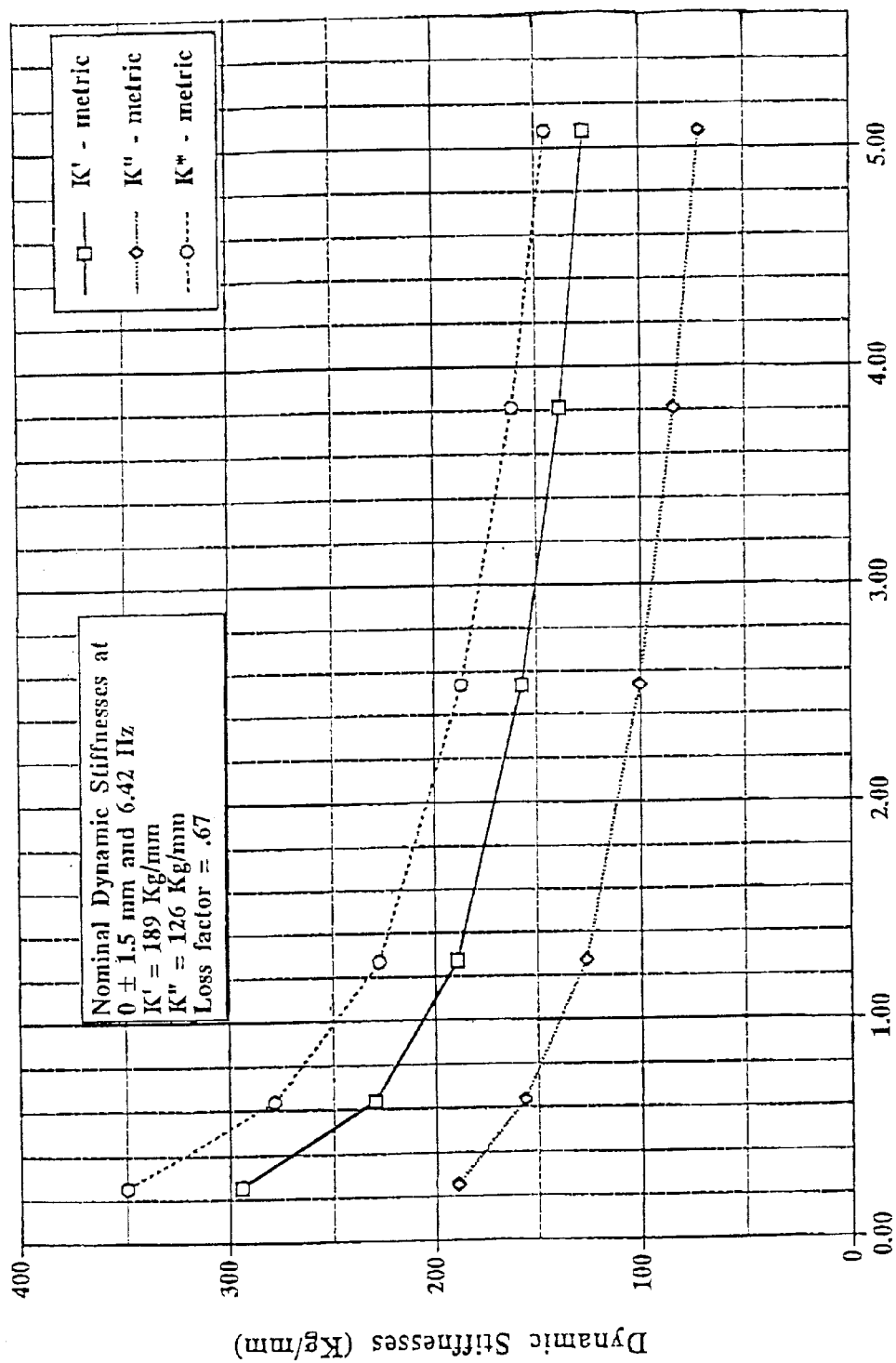
FIG. 2 is a plot of the expected performance of the fluid and elastomer damper.

FIG. 2 illustrates a theoretical performance curve of the fluid and elastomer damper 20 (FIGS. 1a–1c). The plot illustrates the dynamic stiffness, including real K', imaginary K", and complex stiffness K* components as a function of dynamic amplitude between the inner members and outer members. It is notable that the loss factor is about 0.67 at +/−1.5 mm and at 6.42 Hz. This tan delta is achievable in a part that preferably uses a natural rubber synthetic blend. Heretofore, silicone elastomers have been required to achieve such high tan deltas. Notably, silicone materials have much lower strength and fatigue performance than natural/synthetic blends.

While various embodiments, including the preferred embodiment of the present invention has been described in detail, various modifications, alterations, changes and adaptations to the aforementioned may be made without departing from the spirit and scope of the present invention defined in the appended claims. It is intended that all such modifications, alterations and changes be considered part of the present invention.

What is claimed is:

1. A fluid and elastomer damper, comprising:
   (a) an outer member,
   (b) first and second inner members,
   (c) first and second elastomeric elements interconnected between said first inner member and said outer member and between said second inner member and said outer member, respectively, said elastomeric elements cooperating to at least partially define a hollow,
   (d) a disc-shaped divider including a central through hole, said divider being positioned to subdivide said hollow into first and second operating chambers,
   (e) a connector for interconnecting said first and second inner members said connector including a hollow bolt received through an annular spacer,
   (f) a passageway formed by said annular spacer and said central through hole, said passageway interconnecting said operating chambers,
   (g) a viscous fluid contained within said passageway and said operating chambers, and
   (h) a volume compensator including a compensator chamber housed within one of said first and said second inner members wherein said compensator chamber is filled through said hollow bolt.

2. A damper of claim 1 wherein said volume compensator includes a plurality of lock passages formed in tubes pressed into one of said first and said second inner members and interconnecting said compensator chamber to one of said operating chambers, a rigid partition slideable against an inner peripheral surface of one of said inner members, and a charge chamber operative with said partition to exert pressure against an axial surface on said rigid partition and internally pressurize said fluid contained within said operating chambers.

3. A damper of claim 1 including first and second separate fill ports formed in one of the inner members that are used for separately filling said operating chambers and said compensator chamber.

4. A damper of claim 3 wherein a first fill port used to fill said operating chambers passes through one of said inner members and a second fill port used to fill said compensator chamber passes through said hollow bolt of said connector.

5. A damper of claim 3 wherein said divider is manufactured from a material exhibiting a relatively high thermal conductivity.

6. A damper of claim 1 wherein one of said operating chambers includes an annular bubble trap formed in an axial end one of said inner members to focus any air bubbles into at least one fill port, said at least one fill port intersecting said bubble trap.

7. A damper of claim 6 wherein said at least one fill port is further comprised of first and second chamber fill ports which intersect said annular bubble trap to aid in filling said chambers by readily allowing any air bubbles to escape.

8. A damper of claim 6 wherein said at least one fill port interconnects between one of said chambers and an enlarged recess formed in an axial end of one of said inner members.

9. A damper of claim 6 wherein said annular depression is formed in an axial face of one of said inner members.

10. A damper of claim 1 wherein said outer member interconnects to a rotor hub by a clevis secured to an end of said outer member.

11. A damper of claim 1 wherein one of said inner members interconnects to a rotor cuff or rotor blade by a rod end affixed to one of said inner members.

12. A fluid damper, comprising:
    (a) an outer member including an outer housing having first and second sleeves received therein, and further including a end clevis secured thereto,
    (b) first and second inner members,
    (c) first and second elastomeric elements interconnected between said first inner member and said first sleeve of said outer member and between said second inner member and said second sleeve of said outer member, said elastomeric elements at least partially defining a hollow,
    (d) a disc-shaped divider affixed to said outer member and positioned to subdivide said hollow into first and second operating chambers, said divider including a radial projection contacting ends of the sleeves for centering and positioning the divider,
    (e) a connector for interconnecting said first and second inner members,
    (f) an annular fluid passageway formed between the connector and the divider interconnecting said operating chambers,
    (g) a fluid contained within said annular fluid passageway and said operating chambers, and
    (h) a volume compensator including a compensating chamber and a sliding partition housed within one of said first and said second inner members.

13. A fluid and elastomer device, comprising:
    (a) a first member,
    (b) a second member moveable relative to the first member,
    (c) an elastomeric element flexibly interconnected between said first and said second members,
    (d) a chamber within said device,
    (e) a fluid contained within said chamber,
    (f) at least one fill port interconnecting to said chamber,
    (g) an annular bubble trap formed on a wall portion of said chamber to focus any air bubbles into at least one fill port upon filling said chamber with said fluid, said at least one fill port intersecting the bubble trap, and
    (h) a recess formed in one of said members, said recess interconnecting to said at least one fill port on a side opposed from said bubble trap, said recess being filled with fluid during a fluid fill process and prior to insertion of a fill plug to aid in bubble removal from the device.

14. A device of claim 13 wherein said at least one fill port is further comprised of a first chamber fill port and a second chamber fill port each intersecting said annular bubble trap to aid in filling said chamber and removing any air bubbles from said chamber.

15. A fluid damper, comprising:
    (a) an outer member including an outer housing having first and second sleeves received therein, (b) first and second inner members, (c) first and second elastomeric elements interconnected between said first inner member and said first sleeve of said outer member and between said second inner member and said second sleeve of said outer member, said elastomeric elements at least partially defining a hollow and including elastomer skin portions extending along an inner surface of the first and second sleeves, (d) a divider affixed to said outer member and positioned to subdivide said hollow into first and second operating chambers, said divider including a radial seals engaging the elastomer skin portions, (e) a connector for interconnecting said first and second inner members, (f) a fluid passageway interconnecting said operating chambers, (g) a fluid contained within said annular fluid passageway and said operating chambers, and (h) a volume compensator including a compensating chamber housed within one of said first and said second inner members.

16. A fluid damper, comprising:

(a) an outer member including a generally cylindrical outer housing having first and second sleeves received therein, (b) a clevis threadedly secured to an end of said outer member, (c) first and second inner members, (d) first and second annular elastomeric elements interconnected between said first inner member and said first sleeve of said outer member and between said second inner member and said second sleeve of said outer member, said elastomeric elements at least partially defining a hollow, (e) a divider including a through bore affixed to said outer member and positioned to subdivide said hollow into first and second operating chambers, said divider including radial engaging seals, (f) a connector for interconnecting said first and second inner members, said connector including a tubular spacer and a hollow bolt, (g) a fluid passageway interconnecting said operating chambers formed by the tubular spacer and the through bore, (h) a fluid contained within said annular fluid passageway and said operating chambers, (i) a volume compensator including a compensating chamber housed within one of said first and said second inner members, said compensator including a rigid partition axially slideable within one of the inner members, said partition including a gas-charged chamber on a first side and the compensating chamber on a second side thereof, said compensating chamber being filled through the hollow bolt, and (j) a rod end affixed to one of said inner members.

* * * * *